G. C. THOMAS.
Nut-Lock Washers.
No. 158,149.
Patented Dec. 22, 1874.
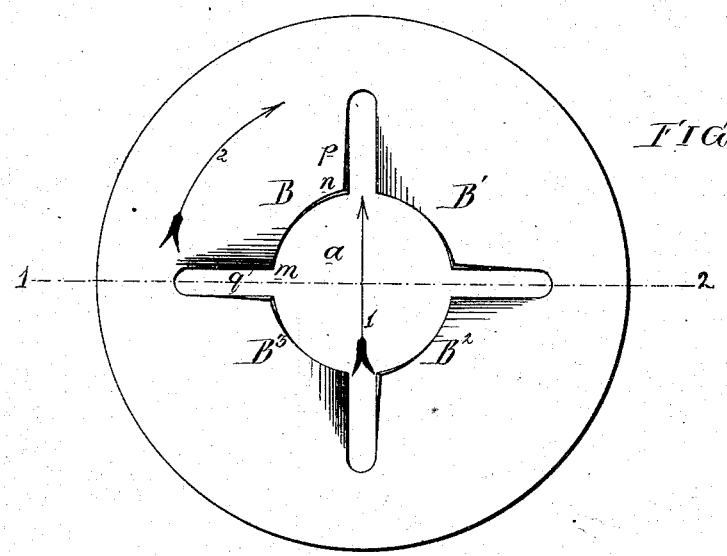
Fig. 1.
Fig. 2.
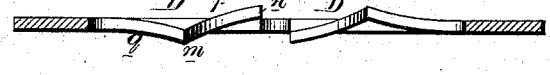
Witnesses,
Thomas McIlvain
Hubert Howson
George C. Thomas
by his Attys.
Howson and Son

UNITED STATES PATENT OFFICE.

GEORGE C. THOMAS, OF NEW YORK, N. Y.

IMPROVEMENT IN NUT-LOCK WASHERS.

Specification forming part of Letters Patent No. 158,149, dated December 22, 1874; application filed November 16, 1874.

*To all whom it may concern:*

Be it known that I, GEORGE C. THOMAS, of the city, county, and State of New York, have invented an Improved Lock-Nut Washer, of which the following is a specification:

My invention relates to an improvement in or modification of the nut-locking washer for which Letters Patent were granted to me on the 13th day of January, 1874.

In the accompanying drawing, Figure 1 represents a plan view of my improved nut-locking washer, drawn to an enlarged scale; and Fig. 2, a vertical section, looking in the direction of the arrow 1, Fig. 1.

The washer consists of a ring of thin steel, having a central opening, $a$, large enough to fit freely over the bolt. The washer is split or slotted from the edge of this central opening to the extent, or about the extent, shown in the drawing, there being, by preference, four radial slots or slits arranged at equal distances apart, thus leaving four lips, B $B^1$ $B^2$ $B^3$. One corner of each lip is bent downward below the under surface of the washer, and the other bent upward above the upper surface of the same. Of the lip B, for instance, the corner $m$ is depressed and the corner $n$ elevated, as shown in Fig. 2. The bends, however, are not abrupt, but extend from the ends of the slit; in other words, each lip is so twisted as to present two sharp edges, $p$ and $q$, the nut bearing against the elevated edge $p$, and the sharp edge $q$ bearing on the object to which the washer is compressed by the nut, on tightening which, by turning it in the direction of the arrow 2, Fig. 1, it will pass freely over the elevated edges of the lips, the sharp cutting-edges of which will be presented as obstacles to resist any attempt to turn the nut back, while the force exerted to turn the washer will be resisted by those sharp edges of the lips, which are depressed, and which will cut the object against which the washer bears before the latter can be turned. These retaining-edges are, in fact, similar in their action to those described in my aforesaid patent, in which, however, the slots commence at a distance from the edge of the central opening and extend out to the edge of the washer.

It is immaterial whether the lips B are separated from each other by radial slits made by simply severing the metal, or by slots made by cutting away a portion of the metal, as shown.

I claim as my invention, and as a new article of manufacture—

The within-described washer, consisting of a ring of thin steel, having internal lips B formed by radial slits or slots, each lip having one sharp edge depressed and the other elevated, all as set forth.

In testimony whereof I have signed my name to this specification in the presence of two subscribing witnesses.

GEORGE C. THOMAS.

Witnesses:
HARRY SMITH,
HUBERT HOWSON.